United States Patent
Song et al.

(10) Patent No.: US 11,607,815 B2
(45) Date of Patent: Mar. 21, 2023

(54) TWO-DEGREE-OF-FREEDOM ROPE-DRIVEN FINGER FORCE FEEDBACK DEVICE

(71) Applicant: SOUTHEAST UNIVERSITY, Nanjing (CN)

(72) Inventors: Aiguo Song, Nanjing (CN); Bincheng Shao, Nanjing (CN); Huijun Li, Nanjing (CN); Hong Zeng, Nanjing (CN); Baoguo Xu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/609,446

(22) PCT Filed: Jan. 29, 2021

(86) PCT No.: PCT/CN2021/074303
§ 371 (c)(1),
(2) Date: Nov. 8, 2021

(87) PCT Pub. No.: WO2022/141726
PCT Pub. Date: Jul. 7, 2022

(65) Prior Publication Data
US 2022/0314458 A1 Oct. 6, 2022

(30) Foreign Application Priority Data
Dec. 31, 2020 (CN) .......................... 202011636620.6

(51) Int. Cl.
*B25J 13/08* (2006.01)
*B25J 13/02* (2006.01)
*B33Y 80/00* (2015.01)

(52) U.S. Cl.
CPC .......... *B25J 13/025* (2013.01); *B25J 13/085* (2013.01); *B25J 13/088* (2013.01); *B33Y 80/00* (2014.12)

(58) Field of Classification Search
CPC ...... B25J 13/088; B25J 13/081; B25J 13/025; B25J 13/085; G06F 3/016; G06F 3/014; B33Y 80/00
See application file for complete search history.

(56) References Cited

U.S. PATENT DOCUMENTS 6,037,703 A 3/2000 Kambe et al.
6,244,644 B1 * 6/2001 Lovchik ............... B25J 15/0009
901/29

(Continued)

FOREIGN PATENT DOCUMENTS

CN 101739129 A 6/2010
CN 102773861 A 11/2012

(Continued)

OTHER PUBLICATIONS

Mio et al., Development and assessment of a powered 3D-printed prosthetic hand for transmetacarpal amputees, 2017, IEEE, p. 85-90 (Year: 2017).*

(Continued)

*Primary Examiner* — McDieunel Marc
(74) *Attorney, Agent, or Firm* — Muncy, Geissler, Olds & Lowe, P.C.

(57) ABSTRACT

The present invention provides a two-degree-of-freedom rope-driven finger force feedback device. The two-degree-of-freedom rope-driven finger force feedback device includes a hand support mechanism, a thumb movement mechanism, an index finger movement mechanism, and a handle mechanism. The hand support mechanism includes a motor, a motor shaft sleeve, a sliding rail, and an inertial measurement unit (IMU) sensor. The thumb movement (Continued)

mechanism includes a long rotary disc, a torque sensor, an angle sensor, a thumb sleeve, a pressure sensor, two links, a thumb brace, and a thumb fixing ring. The handle mechanism includes a cylindrical handle, a pressure sensor, a flexible fixing band, and a slider. Torque is driven between the rotary disc and the motor by using a rope. The handle mechanism is movable forward and backward and is capable of automatic restoration. By means of the present invention, the problems of the high costs of a conventional finger force feedback device and the unadjustable characteristic of the conventional finger force feedback device are overcome. The device can be tightly worn and has a self-adaptive degree of freedom. Rope driving can ensure a gentle, smooth, and real feedback force. By means of the mounted sensors, information such as a hand posture, a rotation angle and a grip force of a thumb and an index finger, and a contact force of a middle finger can be transmitted in real time.

9 Claims, 6 Drawing Sheets

(56) References Cited

U.S. PATENT DOCUMENTS

| | | | | |
|---|---|---|---|---|
| 8,827,337 | B2* | 9/2014 | Murata | B25J 15/0009 |
| | | | | 294/111 |
| 9,375,382 | B2* | 6/2016 | Fausti | A61H 1/0288 |
| 10,817,056 | B2* | 10/2020 | Gu | B25J 9/0006 |
| 11,465,298 | B2* | 10/2022 | Liu | B25J 15/10 |
| 2009/0031825 | A1 | 2/2009 | Kishida et al. | |
| 2015/0257903 | A1* | 9/2015 | Perry | A61F 2/586 |
| | | | | 623/24 |
| 2016/0018892 | A1* | 1/2016 | Gu | G06F 3/016 |
| | | | | 345/156 |
| 2019/0091040 | A1* | 3/2019 | Gill | A61F 2/585 |
| 2019/0201784 | A1 | 7/2019 | Holz et al. | |
| 2020/0050269 | A1* | 2/2020 | Gu | B25J 9/0006 |
| 2022/0048200 | A1* | 2/2022 | Varley | B25J 15/0009 |

FOREIGN PATENT DOCUMENTS

| | | |
|---|---|---|
| CN | 203280688 U | 11/2013 |
| CN | 103687701 A | 3/2014 |
| CN | 107756404 A | 3/2018 |
| CN | 108381573 A | 8/2018 |
| CN | 108687744 A | 10/2018 |
| CN | 109528448 A | 3/2019 |
| CN | 209216041 U | 8/2019 |
| CN | 110462259 A | 11/2019 |
| CN | 110664583 A | 1/2020 |
| CN | 211189091 U | 8/2020 |
| CN | 111643315 A | 9/2020 |
| EP | 1629949 A2 | 3/2006 |
| KR | 10-2018-0057418 | 5/2018 |
| WO | WO2020076495 A1 | 4/2020 |

OTHER PUBLICATIONS

Chu et al., Design and control of a multifunction myoelectric hand with new adaptive grasping and self-locking mechanisms, 2008, IEEE, p. 743-748 (Year: 2008).*

Jeong et al., Development of KNU hand with infrared LED-based tactile fingertip sensor, 2008, IEEE, p. 1156-1161 (Year: 2008).*

Leddy et al., Preliminary Design and Evaluation of a Single-Actuator Anthropomorphic Prosthetic Hand with Multiple Distinct Grasp Types, 2018, IEEE, p. 1062-1069 (Year: 2018).*

* cited by examiner

TWO-DEGREE-OF-FREEDOM ROPE-DRIVEN FINGER FORCE FEEDBACK DEVICE

TECHNICAL FIELD

The present invention relates to the field of force feedback, to a finger force feedback device, and in particular, to a two-degree-of-freedom rope-driven finger force feedback device.

BACKGROUND

A virtual reality technology develops rapidly. In a virtual scene, in order to enhance the interactivity and immersion between a user and a virtual world, a haptic device is usually introduced. In this way, a user may be allowed to touch and operate a virtual object by means of haptic feedback. However, most force feedback device solutions only have a difference between having feedback and having no feedback, and are mostly limited to the feedback force of the entire hand. A few exoskeleton gloves may generate force feedback on fingers, but have a complex structure and cost much. The exoskeleton gloves are mostly in rigid connection, and therefore have poor adaptability for different hand shapes.

In the field of teleoperation, a general system includes an operator and a force feedback device of a master terminal and a manipulator of a slave terminal. The master terminal transmits a control instruction to the slave terminal and receives force information fed back from the slave terminal. By means of the force feedback device, force tele-presence is enhanced, and misoperation is reduced. In order to sense a magnitude of the force with which the manipulator of the slave terminal grabs an object to prevent the force from being excessively large to damage the object or from being excessively small to be unable to grab, a master terminal device is required to have finger movement and feedback degrees of freedom.

The present invention provides a two-degree-of-freedom rope-driven finger force feedback device. The device can be applied to the field of virtual reality and the field of teleoperation. According to the present invention, the movement and force feedback of a thumb and an index finger are mainly realized, and a finger grip operation in a virtual scene may be performed. Compared with a conventional pure rigid force feedback device, the present invention provides a handle having an adaptive degree of freedom, so that it is more comfortable to wear and move the device. By means of rope driving, the feedback can be more gentle, smooth, and real while ensuring an accurate feedback force. By means of a mounted angle sensor, pressure sensor, and IMU sensor, information such as a hand posture, a grip rotation angle and a grip force of fingers may be acquired in real time. In this way, the device may be used as a master hand mechanism of a teleoperation system.

SUMMARY

The present invention is intended to provide a two-degree-of-freedom rope-driven finger force feedback device, which may be applied to the field of virtual reality and teleoperation. The bending movement of a thumb and an index finger is realized by means of driving by using a rope. By means of a self-adaptive mobile handle, the flexibly and wearing comfort of a mechanism can be improved. By means of a finger brace and a flexible fixing ring, wearing tightness is enhanced.

In order to achieve the above objective, the present invention provides the following technical solutions. A two-degree-of-freedom rope-driven finger force feedback device is provided. The force feedback device includes a hand support mechanism, a thumb movement mechanism, an index finger movement mechanism, and a handle mechanism. Compared with a conventional force feedback mechanism, the present invention has a degree of freedom of finger movement and feedback, thereby overcoming the problem of the unadjustable characteristic of the pure rigid movement. A user can wear the device tightly with a self-adaptive degree of freedom, thereby achieving better human—computer interaction. By means of rope driving, the force feedback can be more gentle, smooth, and real while ensuring an accurate feedback force. By means of mounted sensors, information such as a hand posture, a rotation angle and a grip force of fingers may be transmitted in real time. The hand support mechanism includes a power motor, a motor shaft sleeve, a sliding rail, and an inertial measurement unit (IMU) sensor. The power motor is fixed to a hand support by using bolts. A D-shaped hole is provided on the motor shaft sleeve and mated and tightly assembled with a corresponding power motor shaft. Three counter bores are provided on the sliding rail, and the sliding rail is connected to the hand support mechanism by using bolts and nuts.

As an improvement of the present invention, the thumb movement mechanism includes a long rotary disc, a thumb angle sensor, a thumb sleeve, a thumb thin-film pressure sensor, two links with tension springs, a thumb brace, and a thumb fixing ring. A ball bearing is embedded in the long rotary disc and the long rotary disc is connected to the hand support by using a pin shaft and a circlip. The long rotary disc is freely rotatable about the pin shaft. The thumb sleeve and the long rotary disc, the thumb sleeve and the first primary link, the first primary link and the first secondary link, and the first secondary link and the thumb brace are all connected by using a pin shaft and a circlip and all rotatable about the pin shaft. The thumb fixing ring is fixed to the thumb brace by using bolts and nuts. The driving between the long rotary disc and the motor shaft sleeve is realized by using a rope. The rotation of the long rotary disc drives the motor shaft sleeve to synchronously rotate. The motor shaft sleeve is tightly connected to the power motor. When the power motor generates torque, accurate force feedback may be generated for the rotation of a thumb.

As an improvement of the present invention, the handle mechanism includes a cylindrical handle, a flexible fixing band, and a slider. The flexible fixing band is connected to the cylindrical handle by using the bolts and nuts. The cylindrical handle is fixed to the slider by using bolts. The slider may be snapped into the sliding rail in a groove of the hand support, and is freely movable along the sliding rail. The cylindrical handle is fixed to the slider by using bolts. Cylindrical protrusions are disposed on two sides of the slider and two walls of a groove of a hand mechanism, and springs may be embedded in the cylindrical protrusions. When the slider is forced to deviate from a central position, the slider is automatically restored under the action of a spring force. Mechanism movement may automatically adjust positions of a hand and a mechanism relative to each other, so as to avoid the jamming of the mechanism, and has better human—computer interaction and comfort.

As an improvement of the present invention, the thumb sleeve and an index finger sleeve have a rotational degree of freedom relative to the rotary discs. Rotation angles are respectively measured by angle sensors mounted on the two rotary discs. The rotation angles of a first joint and a second joint of a finger can be outputted in real time.

As an improvement of the present invention, except for the power motor and the sensors, the index finger fixing ring, the thumb fixing ring, and the flexible fixing band are made of a flexible glue material by means of 3D printing, and other mechanisms are made of a high-performance nylon material by means of 3D printing. A middle finger, a ring finger, and a little finger of a hand pass through the flexible fixing band and are fixed to grip the cylindrical handle. An index finger passes through an index finger brace and a circular hole formed on an index finger fixing ring. A first joint extends into the index finger sleeve. A second joint is fixed by the index finger fixing ring. The thumb passes through the thumb brace and a circular hole formed on the thumb fixing ring. The first joint penetrates the thumb sleeve. A second joint is fixed by the thumb fixing ring. The thumb and the index finger may be respectively moved and have two movement degrees of freedom.

As an improvement of the present invention, a top of the handle mechanism is connected to the slider, a groove is provided on an end of the hand support, the sliding rail is fixed in the groove by using the bolts, and the slider is freely movable forward and backward along the sliding rail. Four springs are disposed on the slider and side walls of the groove. The handle mechanism may be automatically restored after deviating from the central position.

As an improvement of the present invention, the power motor is fixed in a circular hole of the hand support by using the bolts, the D-shaped hole mated with the motor shaft of the power motor is provided on a bottom of the motor shaft sleeve and tightly connected to the motor shaft. Ball bearings are respectively embedded in the long rotary disc and the short rotary disc. The long rotary disc and the short rotary disc are connected to the hand support by using the pin shaft and the circlip, and the rotary discs are freely rotatable about the shaft. Fixing holes are provided on two sides of each of the rotary discs, and a rope is threaded from the hole on a left side, wound around the motor shaft sleeve for five to six circles, and threaded out of the hole on a right side of the each rotary disc and tensioned and fixed. By means of rope driving, it can be ensured that the rotary discs and the power motor shaft are synchronously rotated. An upper baffle and a lower baffle are disposed on the motor shaft sleeve, so as to prevent up and down deviation of the rope during rotation.

As an improvement of the present invention, a one-dimensional torque sensor is mounted for each of the long rotary disc and the short rotary disc about movement centers of the pin shafts, so that torque transmitted from the motor may be directly measured, thereby accurately reflecting a magnitude and a direction of a finger feedback force.

As an improvement of the present invention, a thin-film pressure sensor is disposed on inner side surfaces of both the thumb sleeve and the index finger sleeve. The sensor is made of a flexible material, and may be attached to the inner surfaces of the thumb sleeve and the index finger sleeve without influencing the wearing of the finger. When the thumb or the index finger of a user bends toward inside, the fingers are in contact with the thin-film pressure sensors, so that an inward pressure can be measured, that is, a grip force.

As an improvement of the present invention, one thin-film pressure sensor is mounted on the cylindrical handle, and located at a contact point of the middle finger and the cylindrical handle, so that a positive pressure of the middle finger on the cylindrical handle can be measured.

As an improvement of the present invention, the thumb sleeve is connected to the long rotary disc by using the pin shaft. The entirety of the thumb sleeve is freely rotatable about the shaft. The thumb sleeve is connected to the thumb support by using a two-link structure. The thumb sleeve is in close contact with the first joint of the thumb. The thumb support is in contact with the second joint. When the thumb is bent, an angle between two-stage links may be changed. When the thumb is bent inward, an included angle between the links is increased. When the thumb is bent outward, the included angle is decreased. A tension spring is disposed in the middle of the two links. When the angle is increased, the tension spring is stretched to automatically generate a tensile force, thereby ensuring that the thumb movement mechanism and the human thumb are synchronously moved without falling off.

The thumb angle sensor and an index finger angle sensor are respectively disposed on output shafts of the thumb sleeve and the index finger sleeve of the hand support, so that rotation angles of the thumb sleeve and the index finger sleeve can be monitored in real time.

As an improvement of the present invention, the IMU sensor is mounted on a top of the hand support mechanism, so as to output posture information of a hand in real time.

As an improvement of the present invention, a flexible single-point pressure sensor is disposed on inner side surfaces of both the thumb sleeve and the index finger sleeve, so as to detect a grip pressure of two fingers in real time.

Compared with the related art, the present invention has the following advantages and beneficial effects:

1) According to the two-degree-of-freedom rope-driven finger force feedback device designed in the present invention, the handle mechanism and the hand support is freely movable forward and backward by using the slider and the sliding rail. The four springs are disposed on the slider and the side wall of the groove of the hand support, so that the handle mechanism may be automatically restored after deviating from the center position. When the thumb and the index finger perform operations of pinching and gripping, for different hand shapes, the mechanism may automatically adjust the positions of the hand and the mechanism relative to each other. Therefore, mechanism jamming may not occur, and better human-computer interaction and comfort can be achieved.

2) According to the two-degree-of-freedom rope-driven finger force feedback device designed in the present invention, the driving between the rotary discs and the motor shaft sleeve is realized by using the rope. When the power motor generates torque, accurate force feedback may be generated for the rotation of the thumb or the index finger. In this way, more gentle, smooth, and real feedback can be achieved by means of rope driving.

3) According to the two-degree-of-freedom rope-driven finger force feedback device designed in the present invention, most mechanisms are made of the high-performance nylon material by means of 3D printing. Therefore, the device has a light weight, costs little, is easy for maintenance, and is suitable for ordinary people to use.

4) According to the two-degree-of-freedom rope-driven finger force feedback device designed in the present invention, by means of the arrangement of the two links with the tension springs and the finger brace mechanism, the fingers and the mechanisms can be ensured to be not loosened during movement, and the device is can be tightly and comfortably worn.

5) According to the two-degree-of-freedom rope-driven finger force feedback device designed in the present invention, by means of the mounted angle sensor, pressure sensor, and IMU sensor, information such as a hand posture, grip rotation angles of the thumb and the index finger, and a grip force of the thumb and the index finger can be obtained in real time, so as to provide a basis for communication and interaction with a computer.

DESCRIPTIONS OF REFERENCE NUMERALS

1—Hand support, 2—Thumb sleeve, 3—Index finger sleeve, 4—Cylindrical handle, 5—Flexible fixing band, 6—slider, 7—Sliding rail mechanism, 8—Spring, 9—Middle finger thin—film pressure sensor, 10—Power motor, 11—Shaft sleeve, 12—Long rotary disc, 13—Rope, 14—First primary link, 15—Tension spring, 16—First secondary link, 17—Thumb brace mechanism, 18—Thumb fixing ring, 19—Thumb thin—film pressure sensor, 20—Short rotary disc, 21—Thumb angle sensor, 22—Index finger angle sensor, 23—Index finger thin—film pressure sensor, 24—Second primary link, 25—Tension spring, 26—Second secondary link, 27—Index finger brace, 28—Index finger fixing ring, 29—IMU sensor, 30—Thumb torque sensor, 31—Index finger torque sensor.

DETAILED DESCRIPTION

The following describes the technical solutions provided in the present invention in detail with reference to specific implementations. It should be understood that the following specific implementations are merely intended to describe the present invention, and are not intended to limit the scope of the present invention.

Figure 1:
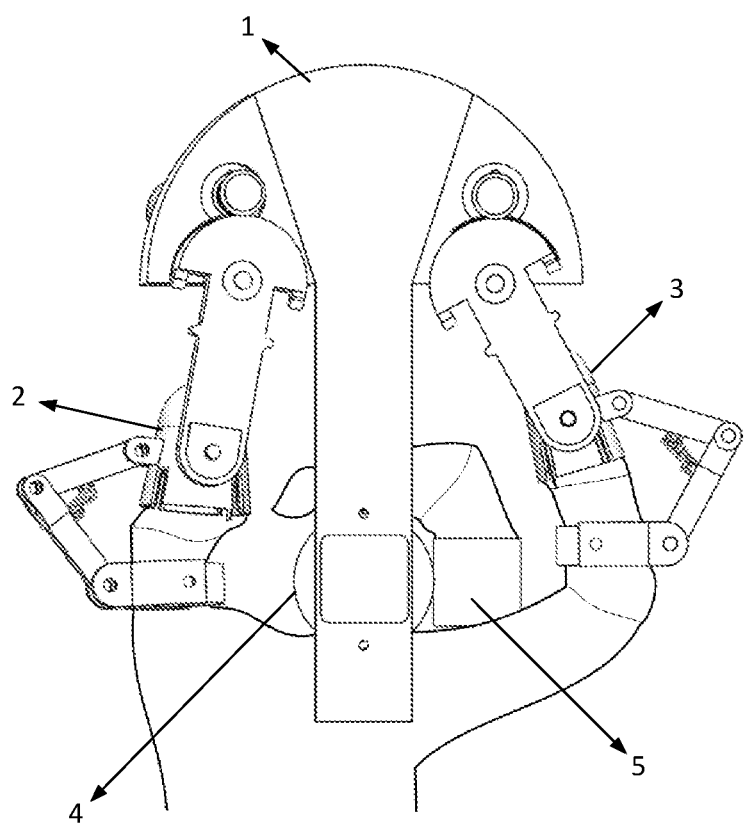
FIG. 1 is a schematic diagram of an entire structure of a two-degree-of-freedom rope-driven finger force feedback device according to the present invention.

The present invention provides a two-degree-of-freedom rope-driven finger force feedback device. As shown in FIG. 1, the device mainly includes a hand support mechanism 1, a thumb movement mechanism, an index finger movement mechanism, and a handle mechanism. A middle finger, a ring finger, and a little finger of a user pass through a flexible fixing band 5 side by side to be tensioned, and are bent to grip a cylindrical handle 4, so that positions of a hand and a force feedback mechanism relative to each other can be ensured to be unchanged. A thumb passes through a thumb brace 17. A first joint of the thumb is extended into a thumb sleeve 2. A thumb rest is fixed on a second joint of the thumb by using a thumb fixing ring 18. An index finger passes through an index finger brace 27. A first joint of the index finger is extended into an index finger sleeve 3. An index finger rest is fixed on a second joint of the index finger by using an index finger fixing ring 28. The thumb and the index finger may respectively perform gripping movement by two rotating degrees of freedom.

Figure 2:
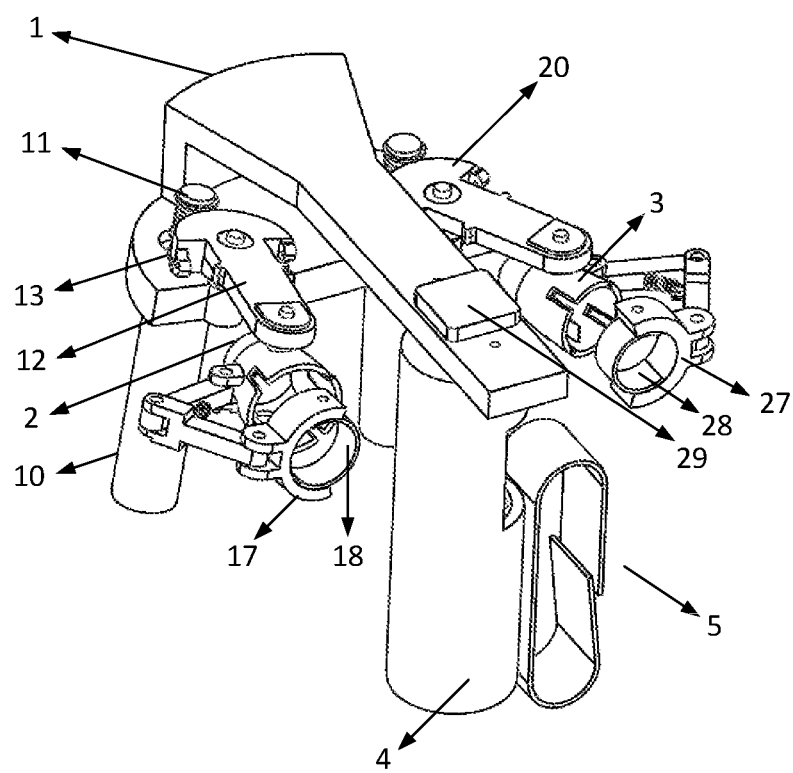
FIG. 2 is a specific implementation diagram of the present invention.

Specifically, as shown in FIG. 2, the hand support mechanism includes a power motor 10, a motor shaft sleeve 11, a sliding rail 7, and an inertial measurement unit (IMU) sensor 29. A tapping threaded hole is formed on an upper surface of the power motor and is fixed to the hand support by using bolts. A D-shaped hole is provided on the motor shaft sleeve and mated and tightly assembled with a corresponding power motor shaft. Three counter bores are provided on the sliding rail, and the sliding rail is connected to the hand support mechanism by using bolts and nuts.

The thumb movement mechanism includes a thumb long rotary disc 12, a thumb torque sensor 30, a thumb angle sensor 21, a thumb sleeve 2, a thumb thin-film pressure sensor 19, two links with tension springs, a thumb brace 17, and a thumb fixing ring 18. A ball bearing is embedded in the thumb long rotary disc, and the thumb long rotary disc is connected to the hand support by using a pin shaft and a circlip. The thumb long rotary disc is freely rotatable about the pin shaft. The thumb sleeve and the thumb long rotary disc, the thumb sleeve and a first primary link, the first primary link and a first secondary link, and the first secondary link and the thumb brace are all connected by using a pin shaft and a circlip and all rotatable about the pin shaft. The thumb fixing ring is fixed to the thumb brace by using bolts and nuts.

The index finger movement mechanism is basically similar to the thumb mechanism, and there are just some changes in sizes. The index finger movement mechanism includes an index finger short rotary disc 20, an index finger torque sensor 31, an index finger angle sensor 22, an index finger sleeve 3, an index finger thin-film pressure sensor 23, two links, an index finger brace 27, and an index finger fixing ring 28.

The handle mechanism includes a cylindrical handle 4, a middle finger thin-film pressure sensor 9, a flexible fixing band 5, and a slider 6. The flexible fixing band is connected to the cylindrical handle by using bolts and nuts. Four self-tapping threaded holes are formed at a bottom of the slider. The cylindrical handle is a hollow structure. The bolts are fixed to the slider by passing through inside.

Except for all of the sensors, the thumb fixing ring, the index finger fixing ring, and the flexible fixing band are printed by using flexible glue, and other mechanisms are printed by using a high-performance nylon material having a light weight and certain hardness.

Figure 3:
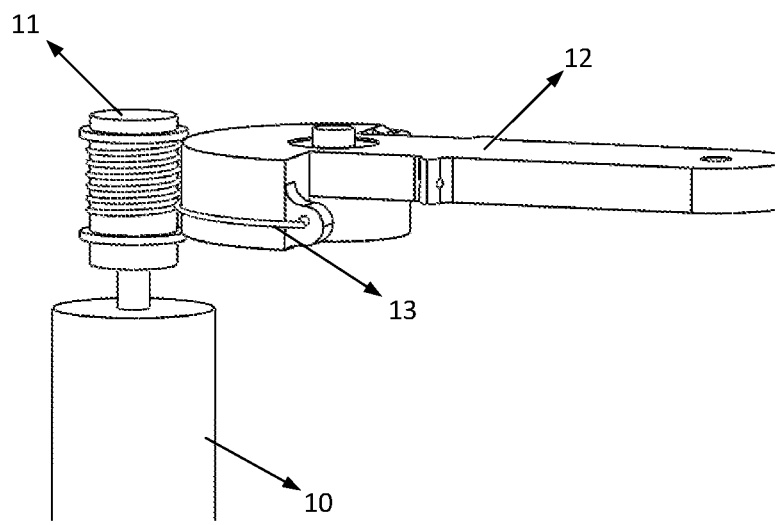
FIG. 3 is a schematic diagram showing connection between a rotary disc mechanism and a motor shaft sleeve.

FIG. 3 is a schematic diagram showing connection between a rotary disc mechanism and a motor shaft sleeve. The long rotary disc and the motor shaft sleeve are used as an example for description. A 0.5 mm gap is formed between the long rotary disc and the motor shaft sleeve for accommodating a rope to pass through. The rope may adopt a soft steel wire rope or a fishing line with toughness. A thickness of the rope is 0.35 mm. The rope is threaded from a hole on a left side of the rotary disc and wound around a curved surface of the rotary disc, then is wound around the motor shaft sleeve reversely for 5-6 circles, and finally threaded out of a hole on a right side of the rotary disc. In a case that the rope is completely tensioned, the rope in the left and right holes is fixed to the rotary disc. The rotation of the rotary disc may drive the motor shaft sleeve to synchronously rotate. A curved surface radius of the rotary disc is 3 times that of the motor shaft sleeve. Therefore, a transmission reduction ratio of the rotary disc to the motor shaft sleeve is 3:1. The motor shaft sleeve is tightly connected to the power motor. When the power motor generates torque, force feedback may be generated for the rotation of the thumb.

Figure 4:
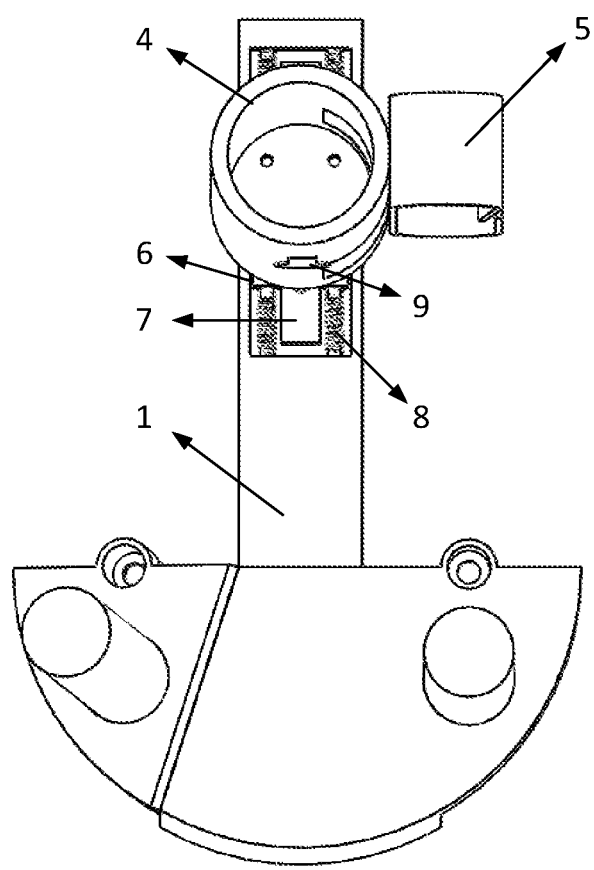
FIG. 4 is a schematic diagram showing connection between a handle mechanism and a hand support mechanism.

FIG. 4 is a schematic diagram showing connection between the handle mechanism and the hand support mechanism. Compared with conventional pure rigid connection, the device is designed to have a structure capable of automatically adjusting a distance and automatic restoration. The slider 6 may be snapped into the sliding rail 7, is freely movable along the sliding rail, and has small resistance. Four tapping threaded holes are formed on a lower surface of the slider. The cylindrical handle is fixed to the slider by using bolts. Three side-by-side counter bores are formed on a lower surface of the sliding rail. The sliding rail and the hand support mechanism are fixed by using bolts and nuts. Cylindrical protrusions are disposed on two sides of the slider and two walls of a groove of a hand mechanism. Four sets of springs 8 may be sleeved on the cylindrical protrusions. When the slider is forced to deviate from a central position and move to the rear of the mechanism, the springs at the rear are compressed, and the springs in the front are stretched. After the force is withdrawn, the slider may be automatically restored to the center position. In this way, when the thumb and the index finger perform operations of pinching and gripping, since hand shapes of a user differ, the mechanism may automatically adjust positions of the hand and the mechanism relative to each other. In this way, mechanism jamming can be avoided, and better human-computer interaction and comfort are achieved. In addition, the middle finger thin-film pressure sensor is mounted on the cylindrical handle, and located at a contact point of the middle finger and the cylindrical handle, so that a positive pressure of the middle finger on the cylindrical handle can be measured.

Figure 5:
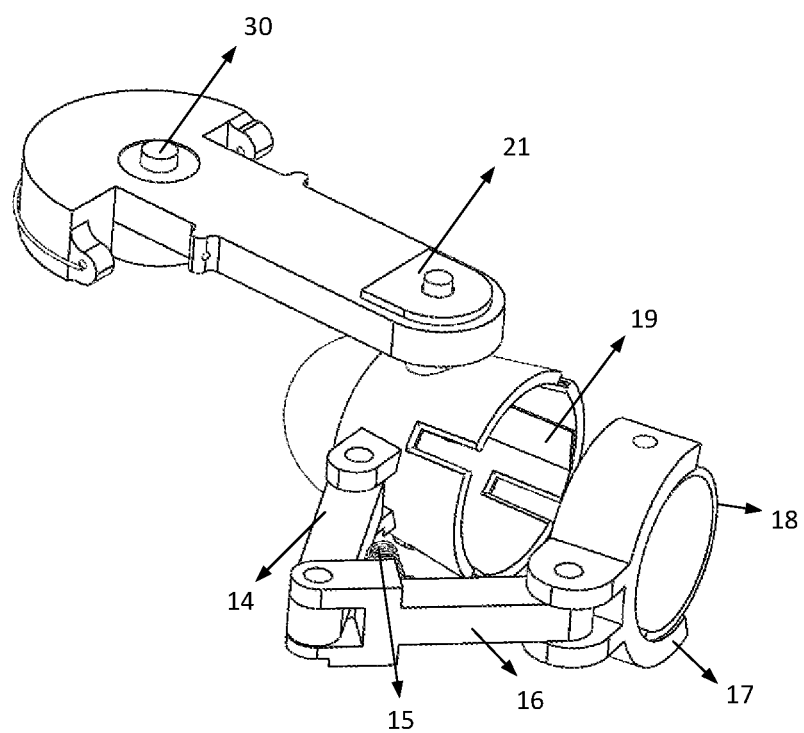
FIG. 5 is an overall structural diagram of a thumb movement mechanism.

FIG. 5 is an overall structural diagram of the thumb movement mechanism. Two through holes are provided on the thumb long rotary disc. A front hole M4 is used to fix the thumb torque sensor, and the thumb torque sensor is connected to the hand support mechanism. A rear hole M3 is used to be connected to the thumb sleeve. A position of an output shaft on the top of the thumb sleeve is vertically limited by using a circlip. The thumb sleeve is freely rotatable about the shaft. A rotation angle is measured by the thumb angle sensor 21 mounted on the thumb long rotary disc. The thumb thin-film pressure sensor is disposed on an inner side surface of the thumb sleeve. The sensor is made of a flexible material, and may be attached to an inner surface of the thumb sleeve without influencing the wearing on the thumb. When the thumb of the user is bent toward inside to move, the thumb is in contact with the thumb thin-film pressure sensor, so that an inward pressure can be measured, that is, a grip force. In order to ensure the thumb sleeve not to be separated from the thumb due to movement, a two-link structure and the thumb brace are disposed. The two-link structure includes a first primary link 14 and a first secondary link 16. Hooklets are provided inside the links. A tension spring 15 is hung on the hooklets on two ends to provide a self-adaptive tensile force. The thumb brace 17 is connected to the links by using a pin shaft and a circlip. During the wearing by the user, the thumb brace is perpendicular to the second joint of the thumb. The thumb fixing ring 18 is a flexible ring. The thumb fixing ring can ensure the second joint of the thumb not to be separated from the thumb brace, and may be adapted to thumbs having different thicknesses.

Figure 6:
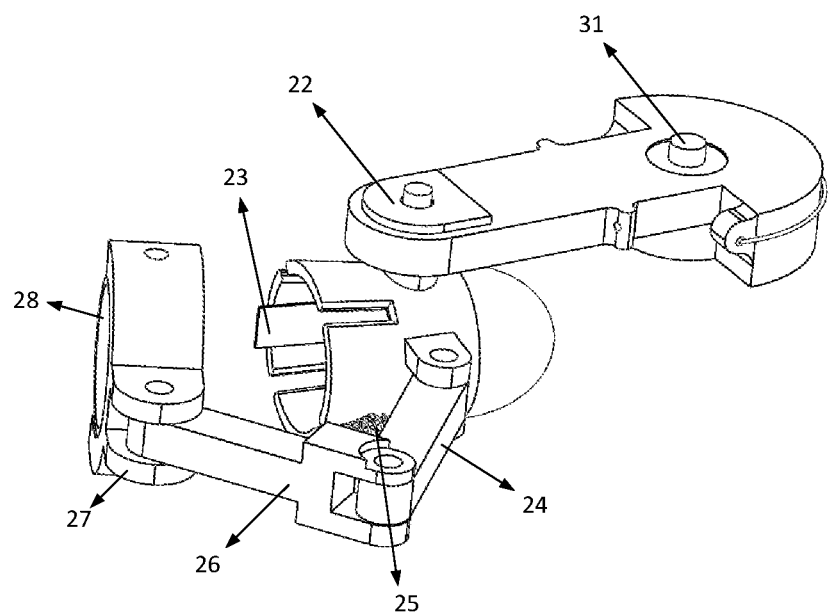
FIG. 6 is an overall structural diagram of an index finger movement mechanism.

FIG. 6 is an overall structural diagram of an index finger movement mechanism. The index finger movement mechanism has a similar structure as the thumb movement mechanism in FIG. 5. Since the index finger is longer than the thumb, the index finger short rotary disc is disposed to ensure the coordination of the entire movement. The rotation angle of the index finger is measured by the index finger angle sensor 22 mounted on the index finger short rotary disc. The pressure by which the index finger is bent toward inside is measured by the index finger thin-film pressure sensor 23. Torque received by the entire rotary disc from the motor is measured by the index finger torque sensor 31. Lengths of a second primary link 24 and a second secondary link 26 may be slightly changed depending on differences between hands. Inner diameters of the index finger brace and the index finger fixing ring may also be adjusted according to the thickness of the second joint of the index finger.

The present invention has a simple structure and low costs and is easy to use. Compared with a conventional pure rigid force feedback device, the present invention overcomes the problems of the unadjustable characteristic and discomfort of the movement. The handle mechanism and the hand support are movable forward and backward and can be automatically restored. The user can tightly wear the device, and the device has a self-adaptive degree of freedom and better human-computer interaction. By means of rope driving, feedback can be more gentle, smooth, and real while ensuring an accurate feedback force. The two links with the tension springs and the finger brace mechanism can ensure the fingers and the mechanism not to be separated during the movement. By means of the mounted angle sensors, pressure sensors, and IMU sensor, information such as a hand posture, a grip rotation angle and a grip force of the fingers may be obtained in real time, so as to provide a basis for communication and interaction with a computer. Most mechanisms are made of the nylon material by means of 3D printing, so that the device costs little, has a light weight, is easy for maintenance, and is suitable for ordinary people to use.

The technical means disclosed in the solutions of the present invention are not limited to the technical means disclosed in the foregoing implementations, and also includes technical solutions including any combination of the foregoing technical features. It should be noted that a person of ordinary skill in the art may make several improvements and modifications without departing from the principle of the present invention, and all such improvements and modifications shall fall within the protection scope of the present invention.

What is claimed is:

1. A two-degree-of-freedom rope-driven finger force feedback device, comprising a hand support mechanism, a thumb movement mechanism, an index finger movement mechanism, and a handle mechanism, wherein the hand support mechanism comprises a hand support, a power motor, a motor shaft sleeve, a sliding rail, and an inertial measurement unit (IMU) sensor, the power motor is fixed to the hand support by using bolts, a D-shaped hole is provided on the motor shaft sleeve and is mated and tightly assembled with a corresponding motor shaft of the power motor, three counter bores are provided on the sliding rail, and the sliding rail is connected to the hand support mechanism by using bolts and nuts; the thumb movement mechanism comprises a long rotary disc, a thumb torque sensor, a thumb angle sensor, a thumb sleeve, a thumb thin-film pressure sensor, a first primary link, a first secondary link, a thumb brace, and a thumb fixing ring, a ball bearing is embedded in the middle of the long rotary disc, the long rotary disc is connected to the hand support by using a pin shaft and a circlip, the long rotary disc is freely rotatable about the pin shaft, the thumb sleeve and the long rotary disc, the thumb sleeve and the first primary link, the first primary link and the first secondary link, and the first secondary link and the thumb brace are all connected by using a pin shaft and a circlip and all rotatable about the pin shaft, the thumb fixing ring is fixed to the thumb brace by using bolts and nuts, and the driving between the long rotary disc and the motor shaft sleeve is realized by using a rope; the index finger movement mechanism and the thumb movement mechanism are the same and symmetrically disposed, the index finger movement mechanism comprises a short rotary disc, an index finger torque sensor, an index finger angle sensor, an index finger sleeve, an index finger thin-film pressure sensor, a second primary link, a second secondary link, an index finger brace, and an index finger fixing ring; and the handle mechanism comprises a cylindrical handle, a middle finger thin-film pressure sensor, a flexible fixing band, and a slider, the flexible fixing band is connected to the cylindrical handle by using bolts and nuts, the cylindrical handle is fixed to the slider by using bolts, the slider is snapped into the sliding rail in a groove of the hand support and freely movable along the sliding rail, the cylindrical handle is fixed to the slider by using bolts, cylindrical protrusions are disposed on two sides of the slider and two walls of a groove of the hand support, and springs are embedded in the cylindrical protrusions.

2. The two-degree-of-freedom rope-driven finger force feedback device according to claim 1, wherein except for the power motor and the sensors, the index finger fixing ring, the thumb fixing ring, and the flexible fixing band are made of a flexible glue material by means of 3D printing, and other mechanisms are made of a high-performance nylon material by means of 3D printing.

3. The two-degree-of-freedom rope-driven finger force feedback device according to claim 1, wherein a top of the handle mechanism is connected to the slider, a groove is provided on an end of the hand support, the sliding rail is fixed in the groove by using bolts, the slider is freely movable forward and backward along the sliding rail, and four springs are disposed on the slider and the side walls of the groove.

4. The two-degree-of-freedom rope-driven finger force feedback device according to claim 1, wherein the middle finger thin-film pressure sensor is mounted to the cylindrical handle and located at a contact point of a middle finger and the cylindrical handle.

5. The two-degree-of-freedom rope-driven finger force feedback device according to claim 1, wherein the power motor is fixed in a circular hole of the hand support by using bolts, the D-shaped hole mated with the motor shaft of the power motor is provided on a bottom of the motor shaft sleeve, the motor shaft sleeve is tightly connected to the motor shaft, ball bearings are respectively embedded in the long rotary disc and the short rotary disc, the long rotary disc and the short rotary disc are connected to the hand support by using the pin shaft and the circlip, the rotary discs are freely rotatable about the shaft, and fixing holes are provided on two sides of each of the rotary discs, and the rope is threaded from the hole on a left side, wound around the motor shaft sleeve for five to six circles, and then threaded out of the hole on a right side of the each rotary disc and tensioned and fixed.

6. The two-degree-of-freedom rope-driven finger force feedback device according to claim 1, wherein the thumb torque sensor and the index finger torque sensor are respectively mounted to centers of movement of the long rotary disc and the short rotary disc about the pin shaft.

7. The two-degree-of-freedom rope-driven finger force feedback device according to claim 1, wherein the thumb angle sensor and the index finger angle sensor are respectively disposed at output shafts of the thumb sleeve and the index finger sleeve of the hand support.

8. The two-degree-of-freedom rope-driven finger force feedback device according to claim 1, wherein the IMU sensor is disposed on an uppermost end of the hand support.

9. The two-degree-of-freedom rope-driven finger force feedback device according to claim 1, wherein a flexible single-point pressure sensor is disposed on inner side surfaces of both the thumb sleeve and the index finger sleeve.

* * * * *